United States Patent
Kato et al.

(10) Patent No.: US 7,119,958 B2
(45) Date of Patent: Oct. 10, 2006

(54) DIFFRACTION GRATING ELEMENT AND OPTICAL PICKUP

(75) Inventors: Masahiro Kato, Takatsuki (JP); Yasuyuki Kochi, Ibaraki (JP); Hideyuki Nakanishi, Otsu (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 200 days.

(21) Appl. No.: 10/964,813

(22) Filed: Oct. 15, 2004

(65) Prior Publication Data
US 2005/0105182 A1  May 19, 2005

(30) Foreign Application Priority Data
Oct. 15, 2003  (JP)  ............... 2003-354851

(51) Int. Cl.
*G02B 5/18* (2006.01)
(52) U.S. Cl. .................. 359/569; 369/112.07
(58) Field of Classification Search ........... 359/566, 359/569, 571, 574, 575, 742; 369/112.03, 369/112.06, 112.07, 112.1, 112.11, 112.12
See application file for complete search history.

(56) References Cited

U.S. PATENT DOCUMENTS 4,983,017 A   1/1991  Tsuji et al.
5,065,380 A *  11/1991  Yokota ............... 369/44.12
2003/0178548 A1 *  9/2003  Nishimoto et al. ..... 250/201.5

FOREIGN PATENT DOCUMENTS

JP    11-296873     10/1999
JP    2000-260035 A  9/2000

* cited by examiner

*Primary Examiner*—Alessandro Amari
(74) *Attorney, Agent, or Firm*—McDermott Will & Emery LLP

(57) ABSTRACT

A diffraction grating element including a diffraction grating area which includes: a first area that is one of two areas into which the diffraction grating area is divided by a first straight line, and is divided, by a second straight line perpendicular to the first straight line, into a first sub-area having a first diffraction grating pattern and a second sub-area having a second diffraction grating pattern, the first and second diffraction grating patterns having different diffraction angles; and a second area that is the other of the two areas into which the diffraction grating area is divided by the first straight line, and is divided into three or more divisional areas that align in a direction perpendicular to the second straight line, the first and second diffraction grating patterns being alternately assigned to each of the divisional areas.

8 Claims, 14 Drawing Sheets

DIFFRACTION GRATING ELEMENT AND OPTICAL PICKUP

This application is based on application No. 2003-354851 filed in Japan, the contents of which are hereby incorporated by reference.

BACKGROUND OF THE INVENTION (1) Field of the Invention

The present invention relates to an optical pickup used for a semiconductor laser apparatus or an optical disc apparatus, and relates to a diffraction grating element that is a component of the optical pickup.

(2) Description of the Related Art

There are various types of optical discs meeting the respective standards, such as CD-ROM (Compact Disc-Read Only Memory), CD-R(Compact Disc-Recordable), CD-RW (Compact Disc-ReWritable), MD (MiniDisc), DVD-ROM (Digital Versatile Disc-Read Only Memory), and DVD-R (Digital Versatile Disc-Recordable). Optical disc systems each adopt a servo signal detection method that meets the standard of the type of optical disc used in the optical disc systems.

Such servo signal detection methods include the spot-size detection method (hereinafter referred to as SSD method) for detecting a focus error signal. The servo signal detection methods also include methods for detecting a tracking error signal, such as the 3-beam method, the push-pull method (hereinafter referred to as PP method), the difference push-pull method (hereinafter referred to as DPP method), and the differential phase detection method (hereinafter referred to as DPD method).

In recent years, the mainstream of the optical disc system is a complex system that can deal with a plurality of types of optical discs, such as a CD complex system that can deal with CD-ROM, CD-R, and CD-RW. Such complex systems are required to adopt both the DPP method and DPD method so that the tracking error signal can be detected from any of the different types of optical discs that have different pit depths.

Japanese Laid-Open Patent Application No. 11-296873 discloses an optical disc system adopting the DPD method. FIG. 1 of the present application is a perspective view showing an error detection part of a conventional optical disc system. FIG. 2 is a plane view showing a diffraction grating element of the conventional optical disc system. FIG. 3 is a plane view showing a light-sensitive element substrate of the conventional optical disc system.

As shown in FIG. 1, a laser beam emitted from a semiconductor laser (not illustrated) travels along an optical axis 101, reaches and is reflected by an optical disc 102. The optical disc 102, a diffraction grating element 103, and a light-sensitive element substrate 104 are arranged in the stated order along the optical axis 101. A reflected beam 105, which is a laser beam reflected by the optical disc 102, passes through the diffraction grating element 103 along the optical axis 101, and reaches the light-sensitive element substrate 104.

The diffraction grating element 103 includes, at the center thereof, a diffraction grating area 106 having a diffraction function and a lens function. As shown in FIG. 2, the diffraction grating area 106 is divided into two: a first area 106a; and a second area 106b, by a straight line 106c that intersects with the optical axis 101 and is parallel to a direction 107 that is tangent to a curve of a pit sequence of the optical disc 102 (hereinafter, the direction 107 is referred to as a tangential direction 107).

The first area 106a and second area 106b have the same diffraction angle and different diffraction directions. Accordingly, the reflected beam 105 that enters the first area 106a is divided into a plus-primary diffracted beam $108a^+$ and a minus-primary diffracted beam $108a^-$, and the reflected beam 105 that enters the second area 106b is divided into a plus-primary diffracted beam $108b^+$ and a minus-primary diffracted beam $108b^-$.

The first area 106a and second area 106b also have a lens effect with which the diffracted beams $108a^-$ and $108b^+$ converge, and the diffracted beams $108a^+$ and $108b^-$ diverge.

As shown in FIG. 3, four light-sensitive areas $109a^+$, $109a^-$, $109b^+$, and $109b^-$ are formed on the light-sensitive surface of the light-sensitive element substrate 104. The light-sensitive areas $109a^+$, $109a^-$, $109b^+$, and $109b^-$ are arranged so that a first straight line 110a, which runs through the center of the light-sensitive areas $109a^+$ and $109a^-$, intersects, approximately at the optical axis 101, with a second straight line 110b that runs through the center of the light-sensitive areas $109b^+$ and $109b^-$.

Each of the light-sensitive areas $109a^+$ and $109a^-$ is divided into areas Ea1, Ea2, Eb, and Ec by three straight lines that are parallel to the first straight line 110a, where Ea1 and Ea2 are inner areas and Eb and Ec are outer areas. Similarly, each of the light-sensitive areas $109b^+$ and $109b^-$ is divided into areas Ea1, Ea2, Eb, and Ec by three straight lines that are parallel to the second straight line 110b, where Ea1 and Ea2 are inner areas and Eb and Ec are outer areas.

As shown in FIG. 2, the plus-primary diffracted beam $108a^+$ and minus-primary diffracted beam $108a^-$ divided in the first area 106a are diffracted in directions indicated as $111a^+$ and $111a^-$ along the first straight line 110a, respectively. Also, the plus-primary diffracted beam $108b^+$ and minus-primary diffracted beam $108b^{31}$ divided in the first area 106b are diffracted in directions indicated as $111b^+$ and $111b^-$ along the second straight line 110b, respectively. The diffracted beams $108a^+$, $108a^-$, $108b^+$, and $108b^-$ are then enter the light-sensitive areas $109a^+$, $109a^-$, $109b^+$, and $109b^-$, respectively.

FIG. 4 shows how the focus error signal is detected by the SSD method. As shown in FIG. 4, a photoelectric conversion signal $R^+i$ is obtained from the inner areas Ea1 and Ea2 of the light-sensitive areas $109a^+$, a photoelectric conversion signal $R^+o$ is obtained from the outer areas Eb and Ec of the light-sensitive areas $109a^+$, a photoelectric conversion signal $R^-i$ is obtained from the inner areas Ea1 and Ea2 of the light-sensitive areas $109a^-$, and a photoelectric conversion signal $R^-o$ is obtained from the outer areas Eb and Ec of the light-sensitive areas $109a^-$. Also, a photoelectric conversion signal $L^+i$ is obtained from the inner areas Ea1 and Ea2 of the light-sensitive areas $109b^+$, a photoelectric conversion signal $L^+o$ is obtained from the outer areas Eb and Ec of the light-sensitive areas $109b^+$, a photoelectric conversion signal $L^-i$ is obtained from the inner areas Ea1 and Ea2 of the light-sensitive areas $109b^-$, and a photoelectric conversion signal $L^-o$ is obtained from the outer areas Eb and Ec of the light-sensitive areas $109b^-$.

In the above-mentioned case, the focus error signal FE is calculated using the following equation.

$$FE=[(L^+i+L^-o)+(R^+i+R^-o)]-[(L^-i+L^+o)+(R^-i+R^+o)] \quad \text{Equation 1}$$

FIG. 5 shows how the tracking error signal is detected by the DPD method. As shown in FIG. 5, obtained are: a sum $Ru^+$ of the photoelectric conversion signals of the inner area Ea1 and the outer area Eb of the light-sensitive areas $109a^+$, a sum $Rd^+$ of the photoelectric conversion signals of the inner area Ea2 and the outer area Ec of the light-sensitive areas $109a^+$, a sum $Ru^-$ of the photoelectric conversion signals of the inner area Ea2 and the outer area Ec of the light-sensitive areas $109a^-$, and a sum $Rd^-$ of the photoelectric conversion signals of the inner area Ea1 and the outer area Eb of the light-sensitive areas $109a^-$. Also obtained are: a sum $Lu^+$ of the photoelectric conversion signals of the inner area Ea1 and the outer area Eb of the light-sensitive areas $109b^+$, a sum $Ld^+$ of the photoelectric conversion signals of the inner area Ea2 and the outer area Ec of the light-sensitive areas $109b^+$, a sum $Lu^-$ of the photoelectric conversion signals of the inner area Ea2 and the outer area Ec of the light-sensitive areas $109b^-$, and a sum $Ld^-$ of the photoelectric conversion signals of the inner area Ea1 and the outer area Eb of the light-sensitive areas $109b^-$.

In this case, the tracking error signal is detected by comparing the phases of "$(Ru^++Ru^-)+(Ld^++Ld^-)$" and "$(Lu^++Lu^-)+(Rd^++Rd^-)$".

As explained above, the focus error signal is detected by the SSD method and the tracking error signal is detected by the DPD method, both from the plus/minus-primary diffracted beams $108a^+$, $108a^-$, $108b^+$, and $108b^-$ diffracted in the diffraction grating area 106.

However, the above-described conventional optical disc system has the following problems.

As explained above, when the focus error signal is detected by the SSD method, signals from the inner areas Ea1 and Ea2 are always added up. As a result, it will be sufficient for each of the light-sensitive areas $109a^+$, $109a^-$, $109b^+$, and $109b$ to be divided into three areas. On the other hand, when the tracking error signal is detected by the DPD method, signals from the inner area Ea1 and outer area Eb are always added up and signals from the inner area Ea2 and outer area Ec are always added up. As a result, it will be sufficient for each of the light-sensitive areas $109a^+$, $109a^-$, $109b^+$, and $109b^-$ to be divided into two areas.

When both the SSD method and DPD method are adopted, however, each of the light-sensitive areas $109a^+$, $109a^-$, $109b^+$, and $109b^-$ needs to be divided into at least four areas. That is to say, to adopt the DPD method, each of the light-sensitive areas $109a^+$, $109a^-$, $109b^+$, and $109b^-$ needs to be divided into four, while it was sufficient for conventional systems to divide each area into three.

When, as is the case with the conventional optical system, the number of the divisional areas increases, various problems occur. For example, an existing light-sensitive circuit needs to be modified significantly, or the light-sensitive circuit becomes complex, or more external output terminals are required in the light-sensitive element substrate 104. The significant modification of the light-sensitive circuit removes from it the compatibility with other existing equipment. The complex light-sensitive circuit or the increase in the number of external output terminals causes the light-sensitive element substrate 104 and the package to grow in size. This prevents the optical disc system from being reduced in size and cost and simplified.

The following explains examples of connections, in the case where each of the light-sensitive areas $109a^+$, $109a^-$, $109b^+$, and $109b^-$ is divided into four small divisional areas, between the divisional areas and the external output terminals. FIGS. 6–8 show examples of connections between the divisional areas and the external output terminals.

FIG. 6 shows a case where no arithmetic circuit is provided on the light-sensitive element substrate 104. In this case, as many external output terminals as there are divisional areas (that is to say, 16) are required.

FIG. 7 shows a case where arithmetic circuits are provided on the light-sensitive element substrate 104 to perform operations of four signals $(L^+i+L^-o)$, $(R^+i+R^-o)$, $(L^-i+L^+o)$, and $(R^-i+R^+o)$ relating to the focus error signal and four signals $(Ru^++Ru^-)$, $(Ld^++Ld^-)$, $(Lu^++Lu^-)$, and $(Rd^++Rd^-)$ relating to the tracking error signal. In this case, eight external output terminals are required in total.

FIG. 8 shows a case where the minimum number of external output terminals are required. In regards with the focus error signal, the arithmetic circuits perform operations of two signals $[(L^+i+L^-o)+(R^+i+R^-o)]$ and $[(L^-i+L^+o)+(R^-i+R^+o)]$ that are obtained by performing operations of the four signals $(L^+i+L^-o)$, $(R^+i+R^-o)$, $(L^-i+L^+o)$, and $(R^-i+R^+o)$.

Also, in regards with the tracking error signal, the arithmetic circuits perform operations of only two signals $(Ru^++Ru^-)$ and $(Lu^++Lu^-)$, and do not perform operations of the remaining two signals $(Ld^++Ld^-)$ and $(Rd^++Rd^-)$. That is to say, the tracking error signal is detected by comparing the phases of signal $(Ru^++Ru^-)$ and signal $(Lu^++Lu^-)$, by the DPD method. In this case, only four external output terminals are required in total.

It is noted that the arithmetic circuits of FIG. 8 are simpler than those of FIG. 7 and the number of external output terminals of FIG. 8 is half that of FIG. 7. In regards with detection of the focus error signal, however, the allowable range for the amount of signal per terminal in FIG. 8 should be two times that of the original one. Otherwise, the terminal output is saturated. Also, in regards with detection of the tracking error signal, the amount of signal that can be used to detect the tracking error signal in FIG. 8 is half the original one.

In addition, if the arithmetic circuits of FIG. 8 is applied to a conventional complex system, the PP method should be additionally adopted. This may make the arithmetic circuits more complex or increase the number of external output terminals. It should be noted here that the PP method is a method for detecting a deviation of the optical axis 101 in a radial direction 112 (a direction perpendicular to the tangential direction 107) towards pit sequences of the optical disc 102, by detecting a difference in the amount of light between the reflected beam 105 having entered the first area 106a and the reflected beam 105 having entered the second area 106b.

With the PP method, the tracking error signal TE is calculated using the following equation using the signals shown in FIG. 4, in a manner similar the calculation of the focus error signal FE by the SSD method.

$$TE=(R^+i+R^-o)+(R^-i+R^+o)-(L^+i+L^-o)-(L^-i+L^+o) \qquad \text{Equation 2}$$

As understood from the above description, the signals used in the PP method are the same as those used in the SSD method, the signals being obtained by dividing each of the light-sensitive areas $109a^+$, $109a^-$, $109b^+$, and $109b^-$ into three areas. Accordingly, when arithmetic circuits explained with reference to FIG. 7 are provided on the light-sensitive element substrate 104, the signals $(L^+i+L^-o)$, $(R^+i+R^-o)$, $(L^-i+L^+o)$, and $(R^-i+R^+o)$ can be used commonly to detect the focus error signal and the tracking error signal by performing different external operations, with use of the SSD method and the PP method, respectively.

On the other hand, to detect the tracking error signal by the PP method in the case shown in FIG. 8, an excessive number of operations are performed by the arithmetic circuits of the light-sensitive element substrate 104. This requires addition of arithmetic circuits and external output terminals, canceling out the merits of reducing the number of external output terminals.

As explained up to now, although it is possible for the SSD and PP methods to share signals in case a certain condition is met, it is difficult for the DPD method to share signals with other methods. That is to say, except for a case where no arithmetic circuit is provided on the light-sensitive element substrate 104, it is impossible for all the methods to share the signals output from the external output terminals, and it is impossible to prevent the arithmetic circuits from becoming complex or prevent the external output terminals from increasing in number.

SUMMARY OF THE INVENTION

The object of the present invention is therefore to provide a diffraction grating element and an optical pickup to which the DPD method can be applied.

The above object is fulfilled by a diffraction grating element including a diffraction grating area which comprises: a first area that is one of two areas into which the diffraction grating area is divided by a first straight line, and is divided, by a second straight line perpendicular to the first straight line, into a first sub-area having a first diffraction grating pattern and a second sub-area having a second diffraction grating pattern, the first and second diffraction grating patterns having different diffraction angles; and a second area that is the other of the two areas into which the diffraction grating area is divided by the first straight line, and is divided into three or more divisional areas that align in a direction perpendicular to the second straight line, the first and second diffraction grating patterns being alternately assigned to each of the divisional areas.

The above-stated construction of an optical pickup, which emits a light beam toward an information recording medium and reads information from a reflected light beam from the information recording medium, provides a compact, low-cost optical pickup that can detect the focus error signal by the SSD method and detect the tracking error signal by the DPP method and the DPD method, with relatively simple circuit structure of the light-sensitive element substrate, and a smaller number of external output terminals.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings.

DESCRIPTION OF THE PREFERRED EMBODIMENT

The following describes a preferred embodiment of the present invention with reference to the attached drawings.

Figure 9:
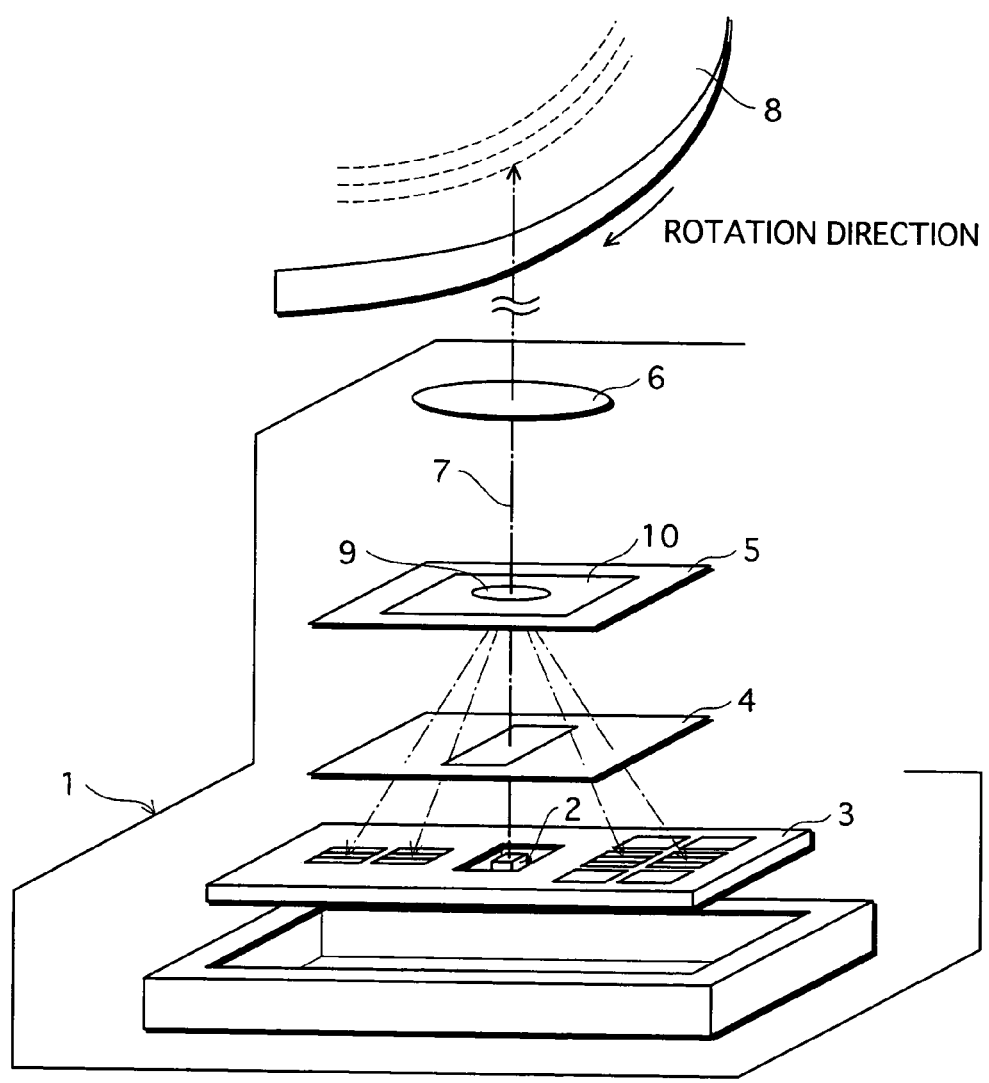
FIG. 9 is a perspective view showing an optical pickup in the embodiment of the present invention.

FIG. 9 is a perspective view showing an optical pickup in the embodiment of the present invention.

As shown in FIG. 9, an optical pickup 1 in the present embodiment includes a semiconductor laser 2, a light-sensitive element substrate 3, a 3-beam diffraction grating 4, a diffraction grating element 5, and an objective lens 6. The semiconductor laser 2 is arranged so that an optical axis 7 of the semiconductor laser 2 is perpendicular to a light-sensitive surface of the light-sensitive element substrate 3. The 3-beam diffraction grating 4, diffraction grating element 5, and objective lens 6 are arranged along the optical axis 7 in the stated order from the light-sensitive element substrate 3 with a predetermined distance therebetween.

Light emitted from the semiconductor laser 2 travels along the optical axis 7, passes through the 3-beam diffraction grating 4, diffraction grating element 5, and objective lens 6 in the stated order, and converges on a pit sequence on a surface of an optical disc 8 which is an information recording medium. A reflected beam 9, which is a beam reflected by the optical disc 8, returns to the diffraction grating element 5 along the optical axis 7, is divided by a diffraction grating area 10 of the diffraction grating element 5, and reaches the light-sensitive element substrate 3. It should be noted here that the laser beam emitted from the light-sensitive element substrate 3 reaches and is divided by the 3-beam diffraction grating 4 into one main beam and two side beams. The side beams will be explained later.

Figure 10:
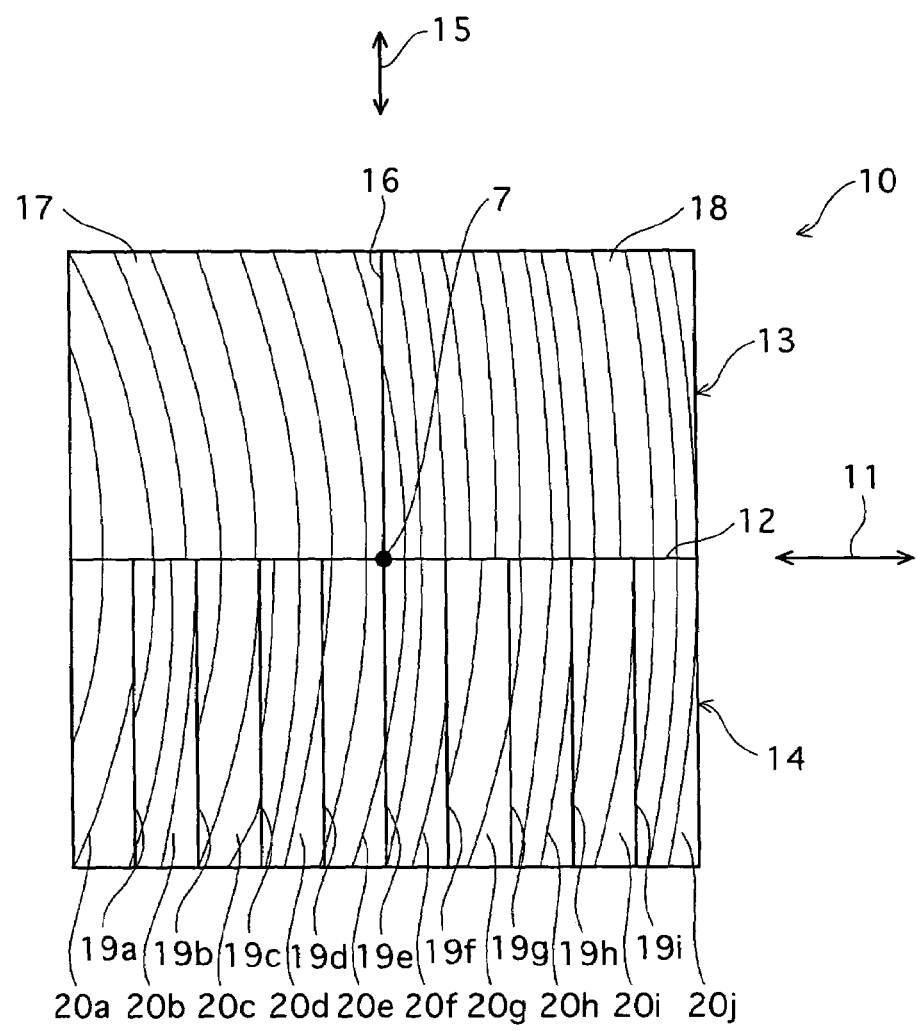
FIG. 10 is a plane view showing the diffraction grating area of the diffraction grating element.

FIG. 10 is a plane view showing a diffraction grating element. As shown in FIG. 10, the diffraction grating area 10 is divided into a first area 13 and a second area 14 by a first straight line 12 that intersects with the optical axis 7 and is parallel to a radial direction 11 of the optical disc 8, so that the first area 13 and second area 14 align in a tangential direction 15 of the optical disc 8. Furthermore, the first area 13 is divided into a third area 17 and a fourth area 18 by a second straight line 16 that intersects with the optical axis 7 and is parallel to the tangential direction 15 so that the third area 17 and fourth area 18 align in the radial direction 11. Also, the second area 14 is divided into 10 divisional areas 20a–20j by nine straight lines 19a–19i that are parallel to the tangential direction 15 so that the divisional areas 20a–20j align in the radial direction 11.

It should be noted here that the second straight line 16, which divides the first area 13, is continuous with a straight line 19e that is a midmost line of the nine straight lines 19a–19i. In other words, the straight line 19e that divides the adjacent divisional areas 20e and 20f is an extension of the second straight line 16. Such a construction in which the second straight line 16 is continuous with the straight line 19e simplifies the area division pattern, and enables the diffraction grating element 5 to be manufactured with more ease and at lower cost.

The third area 17 has a first diffraction grating pattern. The fourth area 18 has a second diffraction grating pattern with a diffraction angle that is larger than a diffraction angle of the first diffraction grating pattern. The first and second diffraction grating patterns are both in a plane that includes the optical axis 7 and the straight line 12, and respectively have focal points to the left of the optical axis in FIG. 10.

The divisional areas 20a–20j have the first and second diffraction grating patterns alternately. That is to say, as shown in FIG. 10, the divisional areas 20a, 20c, 20e, 20g, and 20i have the first diffraction grating pattern, and the divisional areas 20b, 20d, 20f, 20h, and 20j have the second diffraction grating pattern.

Figure 11:
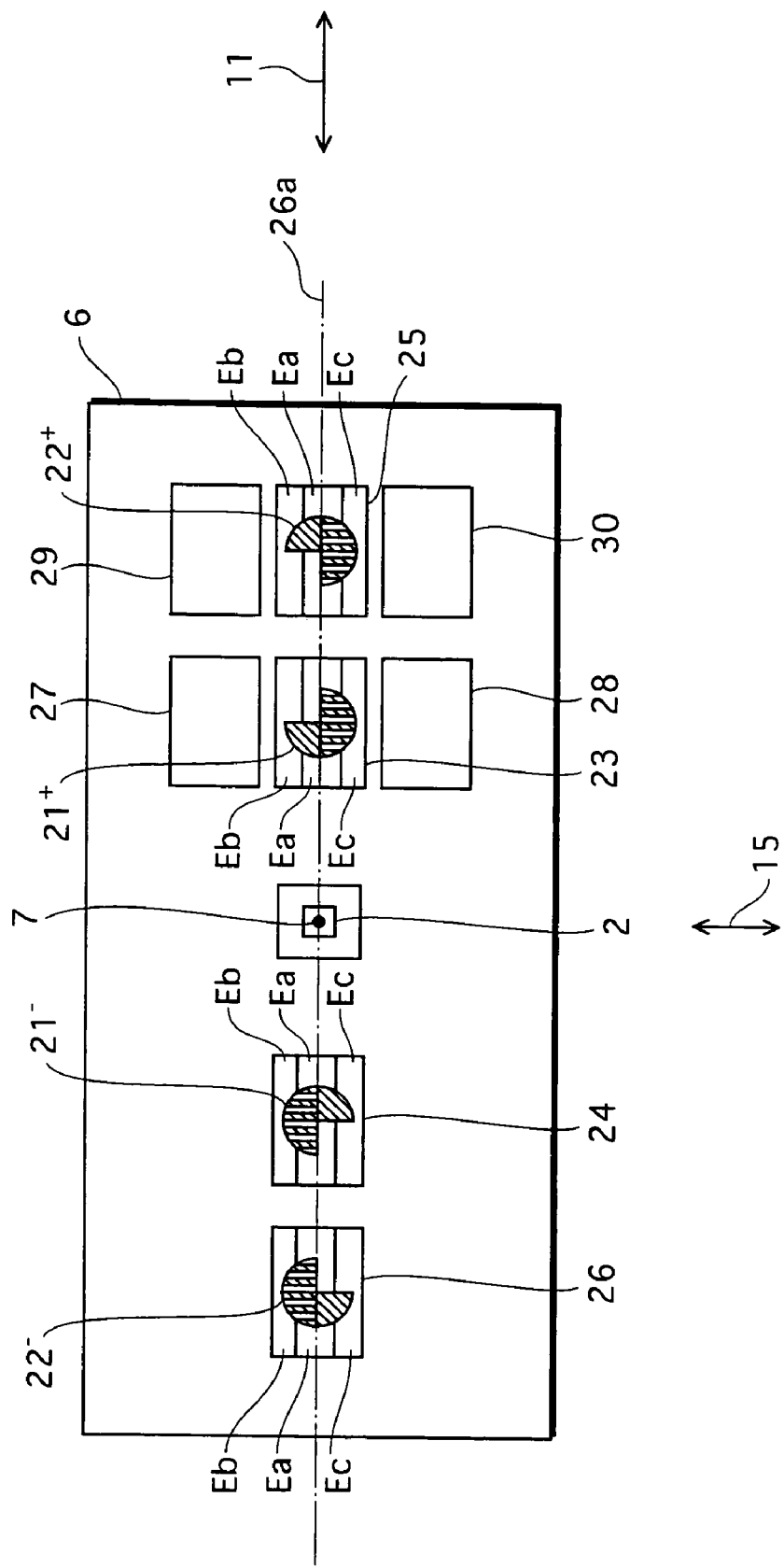
FIG. 11 is a plane view showing the light-sensitive element substrate.

FIG. 11 is a plane view showing the light-sensitive element substrate. As shown in FIG. 11, the reflected beam 9 having entered the third area 17 and the divisional areas 20a, 20c, 20e, 20g, and 20i that have the first diffraction grating pattern is divided into a plus-primary diffracted beam $21a^+$ and a minus-primary diffracted beam $21a^-$, and the reflected beam 9 having entered the fourth area 18 and the divisional areas 20b, 20d, 20f, 20h, and 20j that have the second diffraction grating pattern is divided into a plus-primary diffracted beam $22a^+$ and a minus-primary diffracted beam $22a^-$, and then these diffracted beams reach the light-sensitive surface of the light-sensitive element substrate 3.

The light-sensitive surface of the light-sensitive element substrate 3 is provided with the first to eighth light-sensitive areas 23 to 30.

Of these, the first to fourth light-sensitive areas 23 to 26 are arranged so that a straight line 26a, which intersects with the optical axis 7 and is parallel to the radial direction 11, runs through the center of each of the first to fourth light-sensitive areas 23 to 26. Each of the first to fourth light-sensitive areas 23 to 26 is divided into three areas by two straight lines that are parallel to the straight line 26a being parallel to the radial direction 11 so that the three areas are aligned in the tangential direction 15, the three areas being: a center area Ea and a pair of outer areas Eb and Ec that sandwich the center area Ea.

It should be noted here that each of the first to fourth light-sensitive areas 23 to 26 are not necessarily be divided by straight lines that are parallel to the radial direction 11. For example, in the case shown in FIG. 3 where each of the light-sensitive areas $109a^+$, $109a^-$, $109b^+$, and $109b^-$ is arranged along the first straight line 110a or the second straight line 110b, which are each at an angle with respect to the radial direction 112, each area may be divided by lines that are parallel to the first straight line 110a or the second straight line 110b so that the divisional areas are aligned substantially in the tangential direction 107.

The fifth to eighth light-sensitive areas 27 to 30 are arranged at both sides of the first and third light-sensitive areas 23 and 25 along the tangential direction 15. The fifth to eighth light-sensitive areas 27 to 30 receive a minus-primary diffracted beam that is one of the two side beams that reached and was reflected by the optical disc 8 and then diffracted by the diffraction grating element 5, where the two side beams were generated when the 3-beam diffraction grating 4 divided a laser beam emitted from the light-sensitive element substrate 3.

Figure 12:
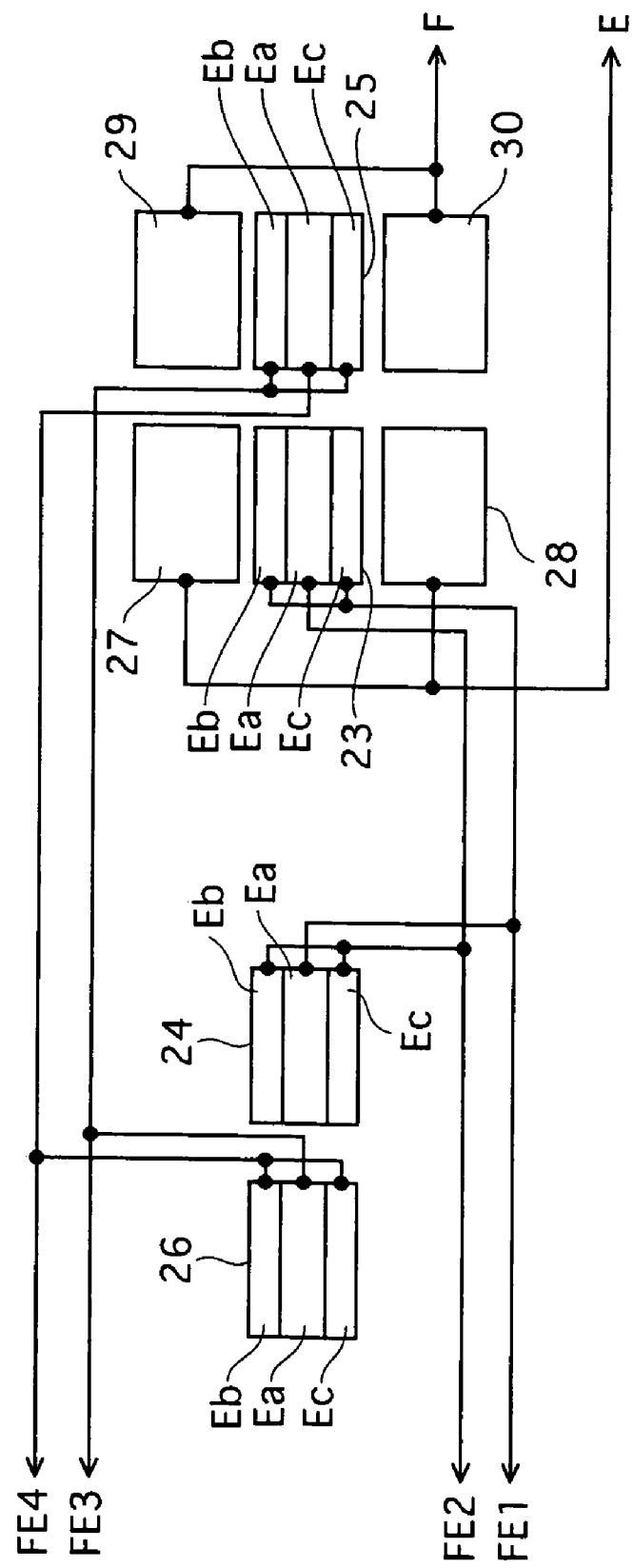
FIG. 12 is a schematic diagram showing connection to each area of the light-sensitive element substrate.

FIG. 12 is a schematic diagram showing connection to each area of the light-sensitive element substrate. As shown in FIG. 12, a sum FE1 is obtained by adding up the photoelectric conversion signals obtained from the outer areas Eb and Ec of the first light-sensitive area 23 and the center area Ea of the second light-sensitive area 24; a sum FE2 is obtained by adding up the photoelectric conversion signals obtained from the center area Ea of the first light-sensitive area 23 and the outer areas Eb and Ec of the second light-sensitive area 24; a sum FE3 is obtained by adding up the photoelectric conversion signals obtained from the outer areas Eb and Ec of the third light-sensitive area 25 and the center area Ea of the fourth light-sensitive area 26; a sum FE4 is obtained by adding up the photoelectric conversion signals obtained from the center area Ea of the third light-sensitive area 25 and the outer areas Eb and Ec of the fourth light-sensitive area 26; a sum E is obtained by adding up the photoelectric conversion signals obtained from the fifth and sixth light-sensitive areas 27 and 28; and a sum F is obtained by adding up the photoelectric conversion signals obtained from the seventh and eighth light-sensitive areas 29 and 30. These signals are used to detect the tracking error signal or focus error signal.

Figure 13A:
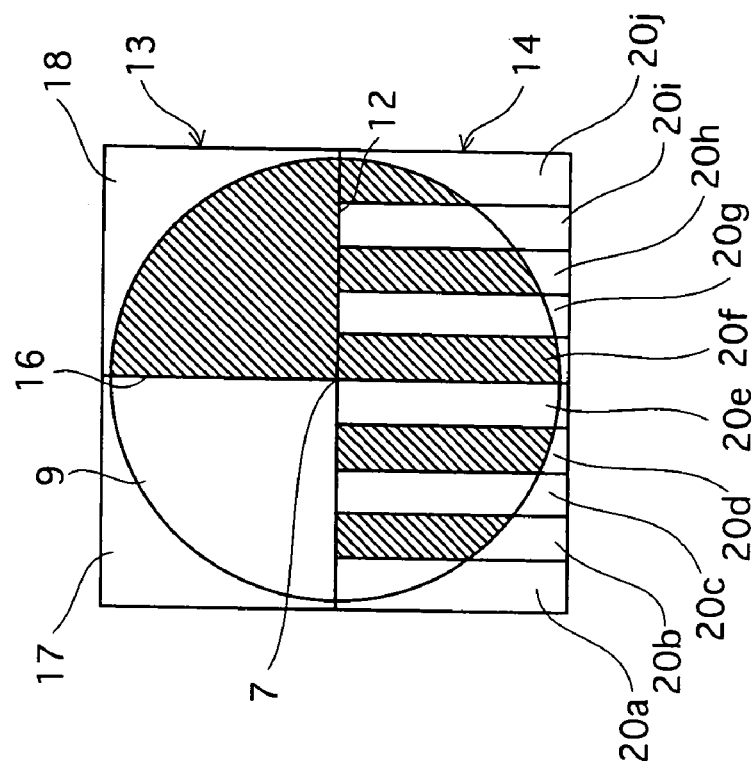
FIG. 13A shows a projection of the reflected beam onto the areas having the first diffraction grating pattern.
Figure 13B:
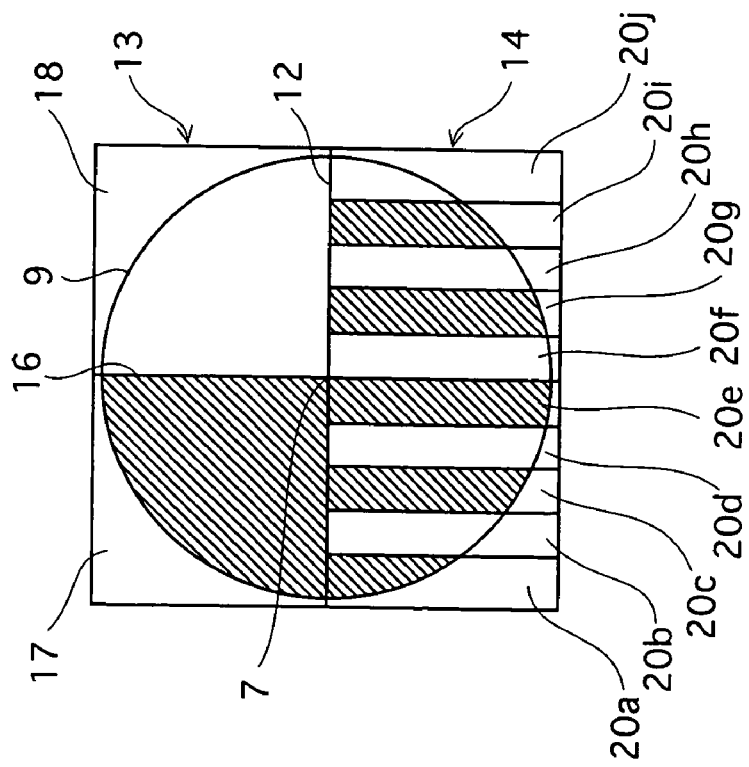
FIG. 13B shows a projection of the reflected beam onto the areas having the second diffraction grating pattern.

FIG. 13A shows a projection of the reflected beam onto the areas having the first diffraction grating pattern. FIG. 13B shows a projection of the reflected beam onto the areas having the second diffraction grating pattern. The reflected beam 9 having entered the third area 17 and the divisional areas 20a, 20c, 20e, 20g, and 20i having the first diffraction grating pattern is divided into the plus-primary diffracted beam $21a^+$ and minus-primary diffracted beam $21a^-$, and the plus-primary diffracted beam $21a^+$ enters the light-sensitive area 23, and the minus-primary diffracted beam $21a^-$ enters the light-sensitive area 24.

The reflected beam 9 having entered the fourth area 18 and the divisional areas 20b, 20d, 20f, 20h, and 20j that have the second diffraction grating pattern is divided into the plus-primary diffracted beam $22a^+$ and minus-primary diffracted beam $22a^-$, and the plus-primary diffracted beam $22a^+$ enters the light-sensitive area 25, and the minus-primary diffracted beam $22a^-$ enters the light-sensitive area 26.

FIG. 11 shows projections of the diffracted beams $21a^+$, $21a^-$, $22a^+$, and $22a$ on the first to fourth light-sensitive areas 23 to 26, respectively. Each projection is composed of (i) a quarter circle that is a projection of a diffracted beam from the third area 17 or the fourth area 18, and (ii) a half circle that is a projection of a diffracted beam from the second area 14 and has one of two different combinations of alternate rectangle portions.

The distribution of amount of light of the reflected beam 9 is indicated as a Gaussian distribution centered on the optical axis 7. As a result, the following (a), (b), and (c) have the same amount of light: (a) a diffracted beam from the third area 17 forming a quarter-circle projection, (b) a diffracted beam from the fourth area 18 forming a quarter-circle projection, and (c) a diffracted beam from the second area 14 with the first or second diffraction grating pattern forming a combination of alternate rectangle portions in a half circle projection. The amount of light of each of the above (a), (b), and (c) is represented by "A×(B/4)", where "A" represents the total amount of light, and "B" represents the diffraction efficiency of the first or second diffraction grating pattern.

Figure 14:
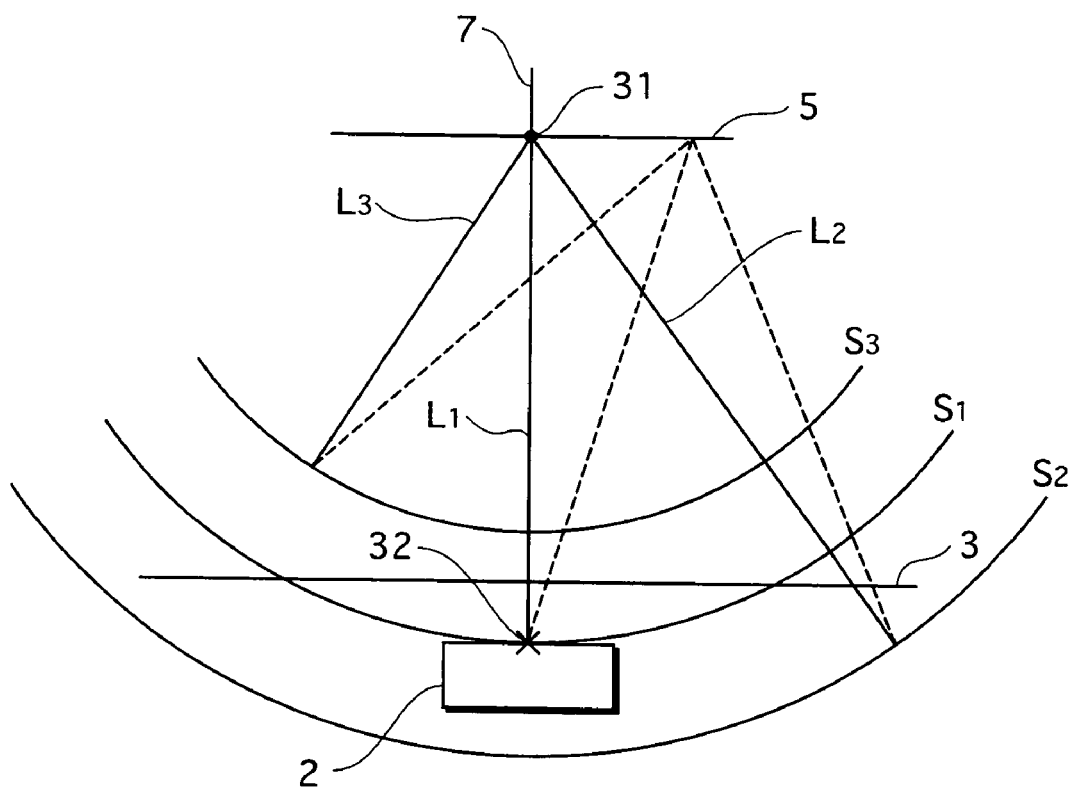
FIG. 14 shows the light paths of the plus- and minus-primary diffracted beams diffracted by the diffraction grating element.

FIG. 14 shows the light paths of the plus- and minus-primary diffracted beams diffracted by the diffraction grating element. In FIG. 14, arcs S1 to S3 are shown. Circles having these arcs each center on an intersection 31 of a surface of the diffraction grating element 5 and the optical axis 7. The circle having the arc S1 is distance L1 in radius, where the distance L1 is a distance between a light emission point 32 of the semiconductor laser 2 and the intersection 31. The plus-primary diffracted beams $21a^+$ and $22a^+$ converge on an arc S2, where the circle having the arc S2 is distance L2 (L2>L1) in radius. The minus-primary diffracted beams $21a^-$ and $22a^-$ converge on an arc S3, where the circle having the arc S3 is distance L3 (L3<L1) in radius. As understood from this, the distance of the focal point of the plus-primary diffracted beams $21a^+$ and $22a^+$ from the intersection 31 differs from that of the minus-primary diffracted beams $21a^-$ and $22a^-$, and the distance varies depending on the lens function of the diffraction grating element 5.

When the objective lens 6 is moved from a standard position toward the optical disc 8 along the optical axis 7, the focal point of the plus-primary diffracted beams $21a^+$ and $22a^+$ moves onto the light-sensitive element substrate 3, and the plus-primary diffracted beams $21a^+$ and $22a^+$ converge on the light-sensitive areas 23 and 25. On the other hand, when the objective lens 6 is moved from the standard position toward the light-sensitive element substrate 3 along the optical axis 7, the focal point of the minus-primary diffracted beams $21a^-$ and $22a^-$ moves onto the light-sensitive element substrate 3, and the minus-primary diffracted beams $21a^-$ and $22a^-$ converge on the light-sensitive areas 24 and 26.

As the above description indicates, the optical pickup 1 in the present embodiment, as is the case with conventional optical pickups, performs the focus adjustment by changing the focal point in position by moving the objective lens 6 along the optical axis 7. This enables the focus error signal to be detected by the SSD method.

Figure 1:
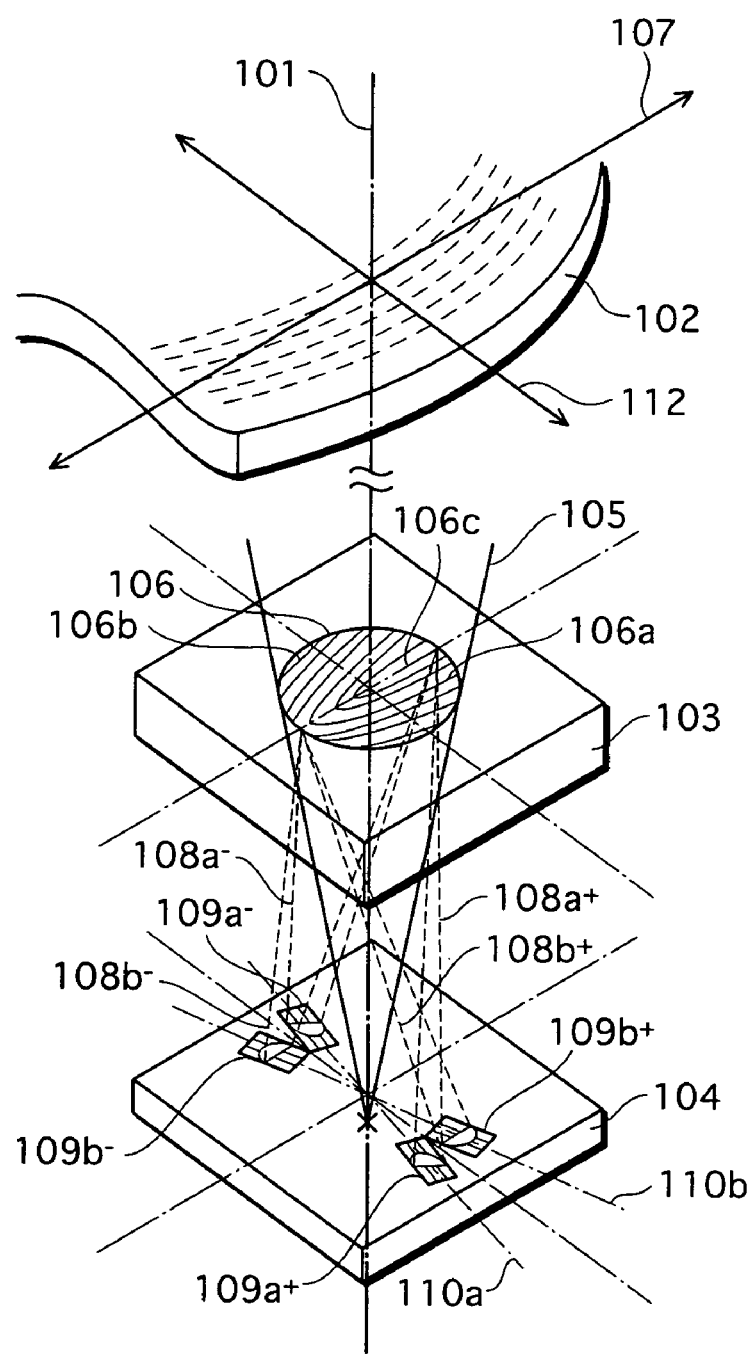
FIG. 1 is a perspective view showing an error detection part of a conventional optical disc system.
Figure 2:
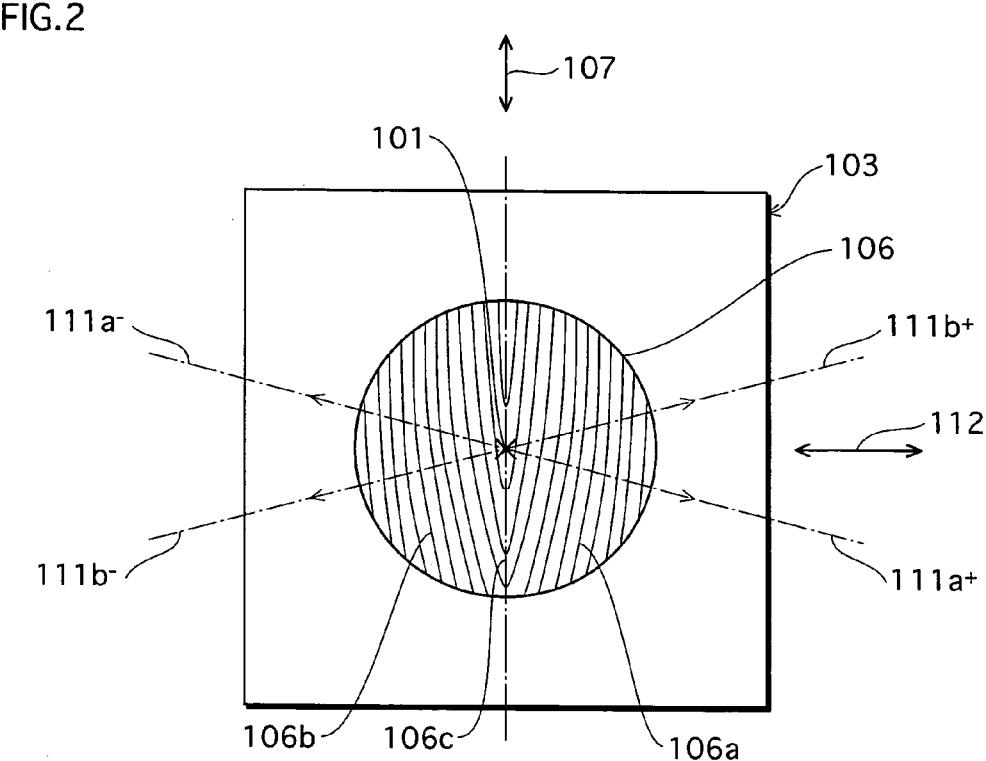
FIG. 2 is a plane view showing a diffraction grating element of the conventional optical disc system.
Figure 3:
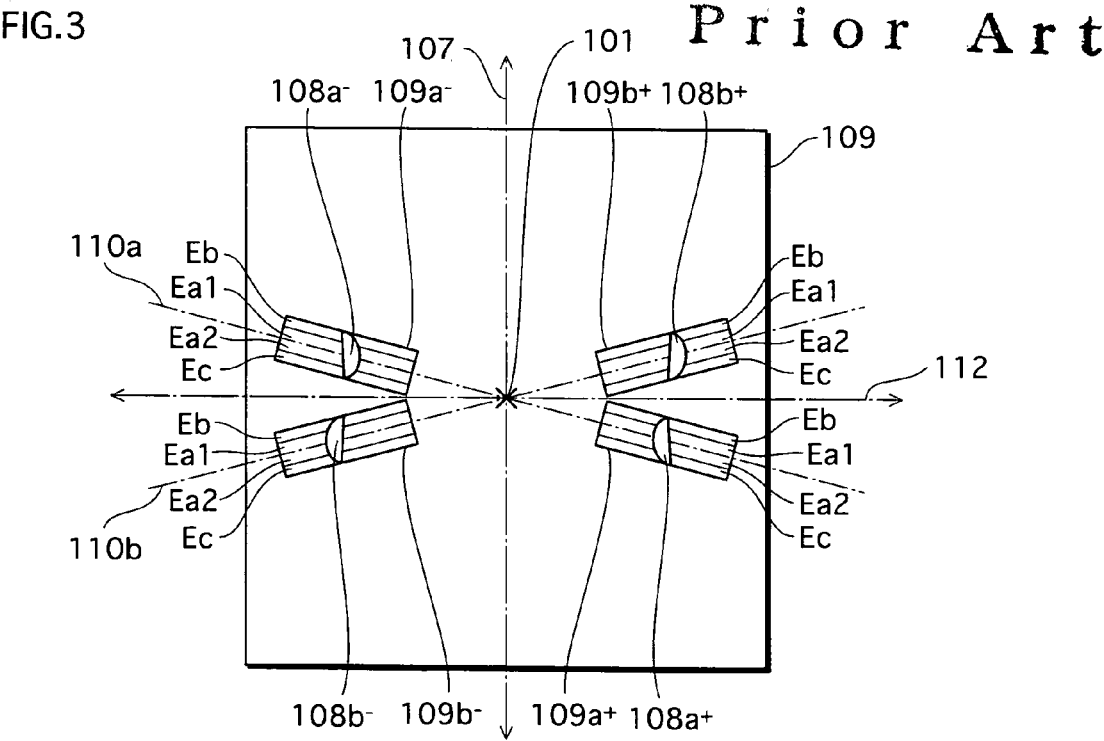
FIG. 3 is a plane view showing a light-sensitive element substrate of the conventional optical disc system.
Figure 4:
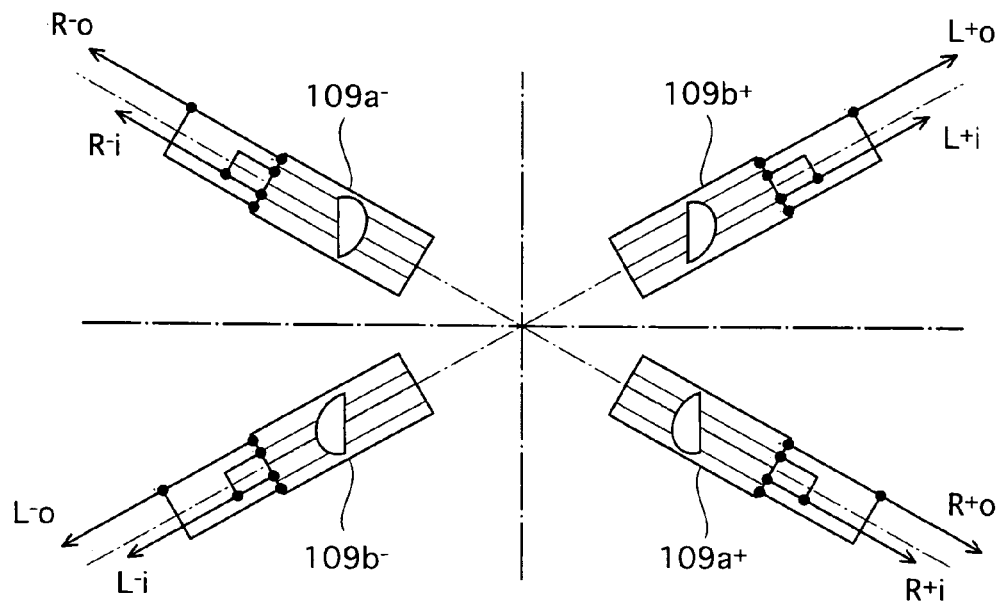
FIG. 4 shows how the focus error signal is detected by the SSD method.
Figure 5:
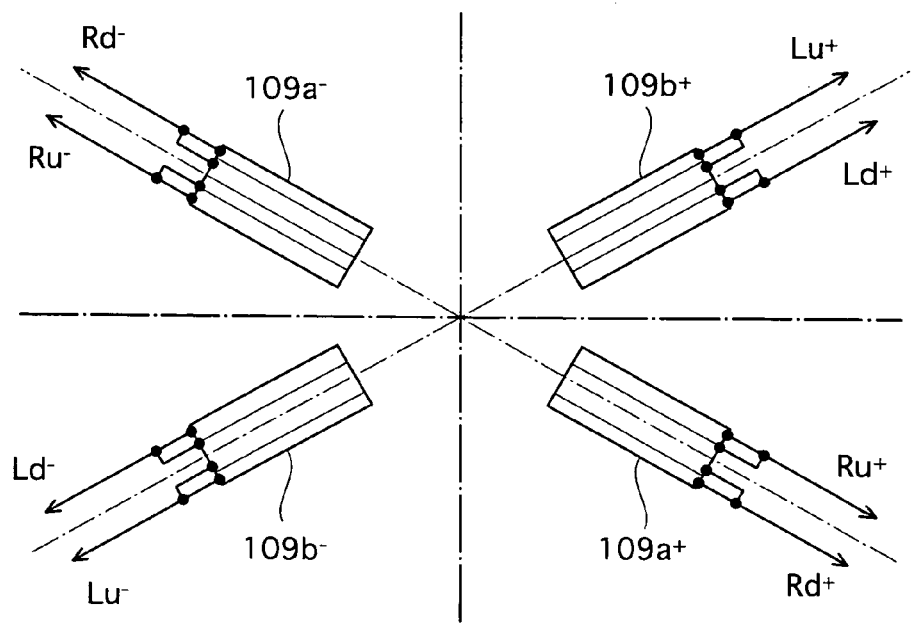
FIG. 5 shows how the tracking error signal is detected by the DPD method.
Figure 6:
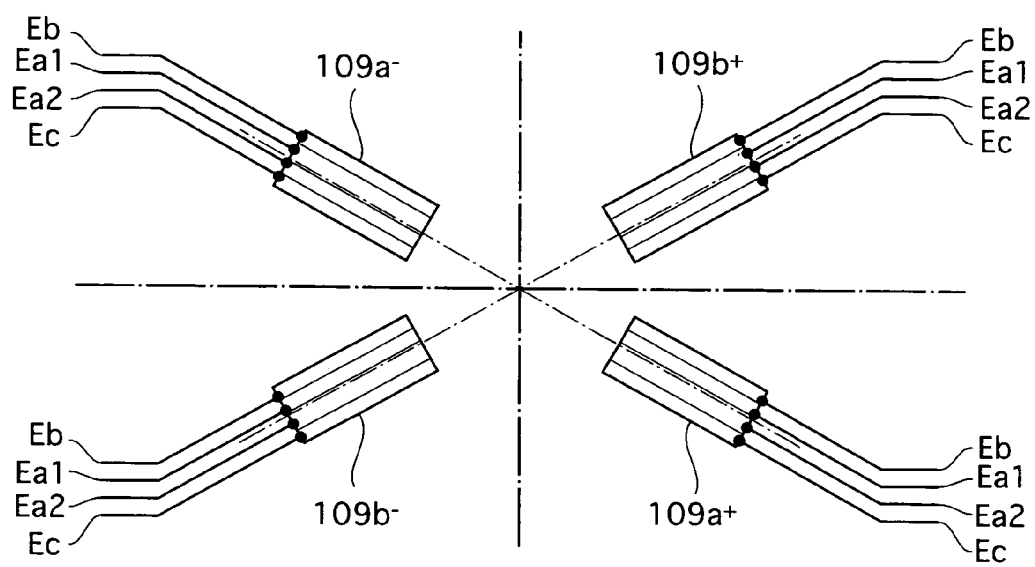
FIG. 6 shows connections between the divisional areas and the external output terminals.
Figure 7:
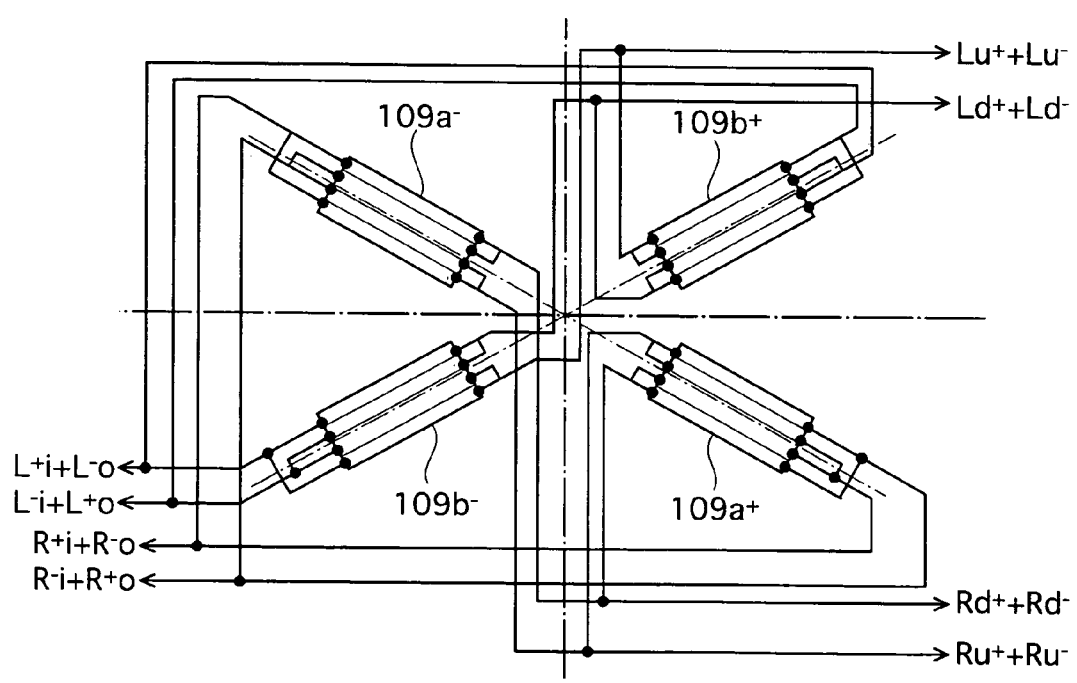
FIG. 7 shows connections between the divisional areas and the external output terminals.
Figure 8:
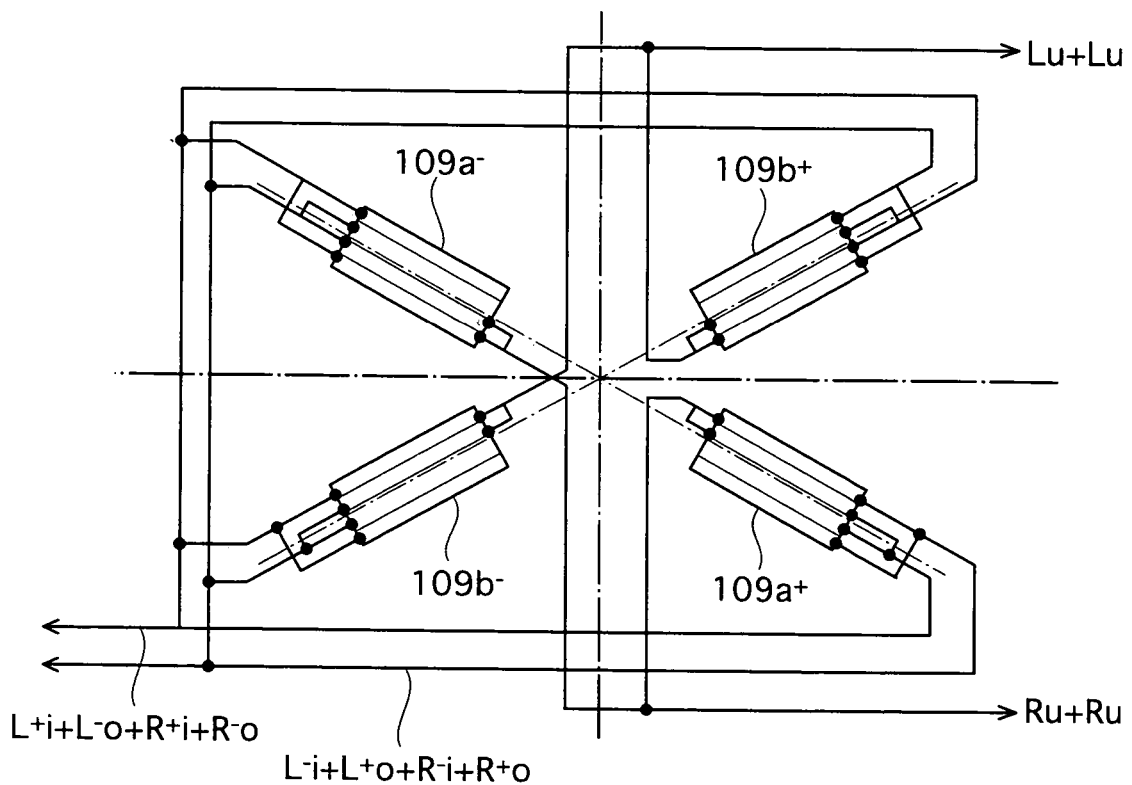
FIG. 8 shows connections between the divisional areas and the external output terminals.

A projection of a diffracted beam in conventional technologies is in a shape of half circle, as shown in FIG. 3. In contrast, a projection of a diffracted beam in the present embodiment is in a shape of a combination of a quarter circle and a half circle composed of alternate rectangle portions. However, even if the diffracted beams have different shapes of projections, the diffracted beams have the same amount of light and the same focal point if they have the same diffraction efficiency and the same diffraction grating pattern.

The focus error signal FE by the SSD method is calculated with the following equation.

$$FE = FE1 + FE3 - FE2 - FE4 \qquad \text{Equation 3}$$

The following will describe what kind of pit information is obtained from diffracted beams divided by the diffraction grating element 5.

Figure 15A:
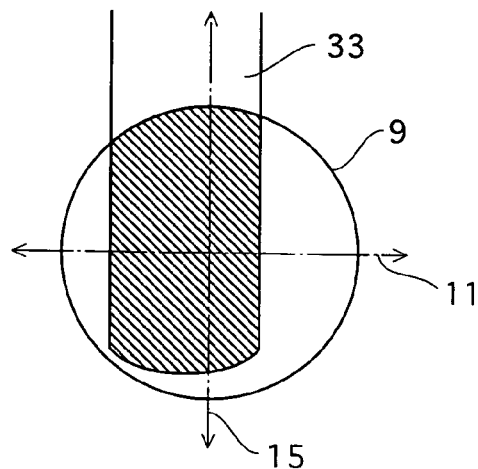
FIG. 15A shows a position at which an emitted light beam enters the optical disc.
Figure 15B:
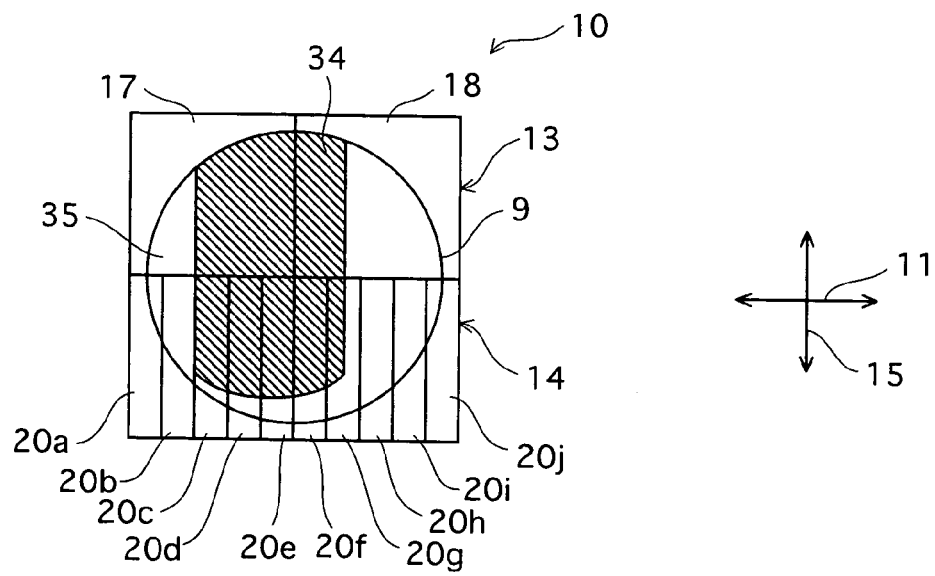
FIG. 15B is a plane view showing a reflected light beam that enters a diffraction grating area.
Figure 15C:
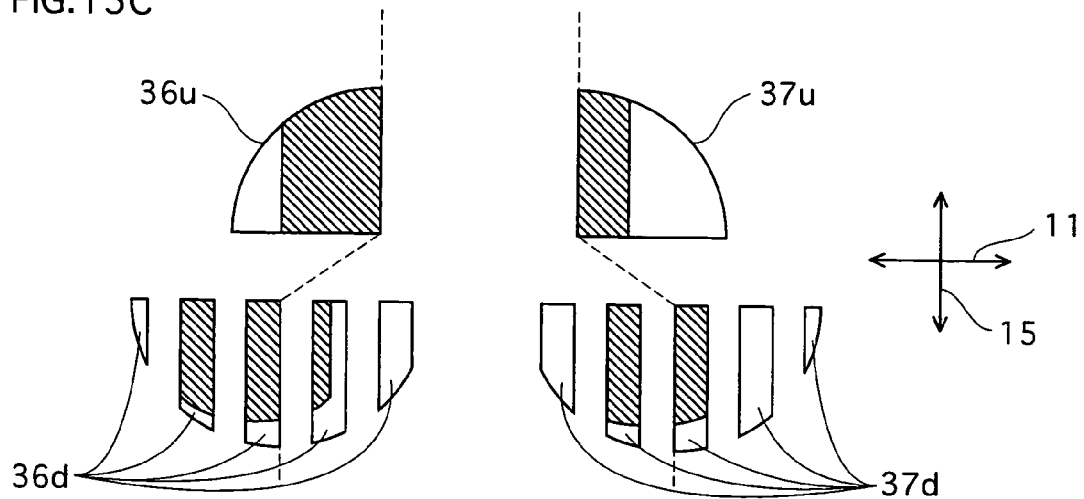
FIG. 15C shows division of a reflected light beam by the diffraction grating element.

FIG. 15A shows a position at which an emitted light beam enters the optical disc. FIG. 15B is a plane view showing a reflected light beam that enters a diffraction grating area. FIG. 15C shows division of a reflected light beam by the diffraction grating element.

As shown in FIG. 15A, it is presumed that a light beam emitted from the semiconductor laser 2 reaches a pit 33 formed on a surface of the optical disc 8 at a position deviated along the radial direction 11 from an intended position. In this case, since the surface inside the pit 33 has a lower reflection rate than the surface outside the pit 33, the shaded portion 34 of the reflected beam has a smaller amount of light than the non-shaded portion 35 (see FIG. 15B).

As shown in FIG. 15C, the reflected beam 9 is diffracted and divided into plus-primary diffracted beams $36u$, $36d$, $37u$, and $37d$, where $36u$ represents a diffracted beam from the third area 17, $37u$ represents a diffracted beam from the fourth area 18, $36d$ represents a diffracted beam from the divisional areas $20a$, $20c$, $20e$, $20g$, and $20i$ of the second area having the first diffraction grating pattern, and $37d$ represents a diffracted beam from the divisional areas $20b$, $20d$, $20f$, $20h$, and $20j$ of the second area having the second diffraction grating pattern. The description of the minus-primary diffracted beams is omitted here.

The diffracted beams $36u$ and $37u$ contain information about deviation of a pit sequence position along the radial direction. That is to say, the information about the deviation can be detected from the diffracted beams $36u$ and $37u$ and a difference in the amount of light.

On the other hand, since each of the diffracted beams $36d$ and $37d$ is from the divisional areas of the second area 14 that align alternately along the radial direction and fail to reflect the difference of the amount of light, the diffracted beams $36d$ and $37d$ do not contain information about deviation of a pit sequence position along the radial direction.

Accordingly, the information about deviation of a pit sequence position along the radial direction is obtained from the diffracted beams $36u$ and $37u$.

It should be noted here that since the diffracted beams $36u$ and $37u$ retain information on whether the pit sequence 33 is present or not, the ability to read data from the optical disc 8 is not degraded.

Now, how to detect the tracking error signal by the DPP method and the DPD method will be described. It is presumed here that the photoelectric conversion signals FE1–FE4, E, and F are used for the detection.

First, detection of the tracking error signal by the DPP method will be described. The tracking error signal TE(DPP) by the DPP method is calculated with the following equation.

$$TE(DPP) = (FE1 + FE2 - FE3 - FE4) + k \times (E - F) \qquad \text{Equation 4}$$

As shown in FIG. 12, the sums FE1 and FE2 are calculated by adding up the photoelectric conversion signals that originate from the plus- and minus-primary diffracted beams $21a^+$ and $21a^-$ that had entered the first and second light-sensitive areas 23 and 24. That is to say, the signals were generated by (i) the diffracted beam $36u$ from the third area 17 having the first diffraction grating pattern, and (ii) the diffracted beam $36d$ from the divisional areas $20a$, $20c$, $20e$, $20g$, and $20i$ having the first diffraction grating pattern.

Similarly, the sums FE3 and FE4 are calculated by adding up the photoelectric conversion signals that originate from the plus- and minus-primary diffracted beams $22a^+$ and $22a^-$ that had entered the third and fourth light-sensitive areas 25 and 26. That is to say, the signals were generated by (i) the diffracted beam 37*u* from the third area 17 having the second diffraction grating pattern, and (ii) the diffracted beam 37*d* from the divisional areas 20*b*, 20*d*, 20*f*, 20*h*, and 20*j* having the second diffraction grating pattern.

As understood from Equation 4, the tracking error signal is obtained by making a comparison between the amount of light of the diffracted beams 36*u* and 36*d* and the amount of light of the diffracted beams 37*u* and 37*d*. And, as described earlier, the diffracted beams 36*u* and 37*u* contain information about deviation of a pit sequence position along the radial direction, but the diffracted beams 36*d* and 37*d* do not contain the information.

Accordingly, in the present embodiment, the information about deviation of a pit sequence position along the radial direction is obtained substantially by making a comparison between the amount of light of the diffracted beam 36*u* from the third area 17 and the amount of light of the diffracted beam 37*u* from the fourth area 18. As understood from this, the tracking error signal by the DPP method can be detected without using the amount of light of the diffracted beams 36*d* and 37*d* from the divisional areas 20*a* to 20*j*.

In the present embodiment, however, since the amount of light of the diffracted beams 36*d* and 37*d* from the divisional areas 20*a* to 20*j* is not used, the signal level is half that of the conventional case shown in FIG. 3 where the diffracted beam is divided into two beams that align in the radial direction 112.

Next, detection of the tracking error signal by the DPD method will be described. The tracking error signal TE(DPD) by the DPD method is detected by making a comparison between (a) the phase of a signal generated by the diffracted beams from the third area 17 and the divisional areas 20*f* to 20*j* and (b) the phase of a signal generated by the diffracted beams from the fourth area 18 and the divisional areas 20*a* to 20*e* (see FIG. 15B). For this reason, in conventional technologies, the diffraction grating area is divided into two by a straight line that intersects with the optical axis and is parallel to the tangential direction 107, and each light-sensitive area is divided into two areas by a straight line that intersects with the optical axis and is parallel to the radial direction 112.

However, in the present embodiment, although the reflected beam that enters the second area 14 contains information about deviation along the radial direction 11, the diffracted beams 36*d* and 37*d* do not contain the information. This enables a comparison to be made between the phase of a signal generated by the diffracted beams from the third area 17 and the phase of a signal generated by the diffracted beams from the fourth area 18, even if the light-sensitive areas are not divided into divisional areas that align in the tangential direction 15. It should be noted here that the amount of detected signal is half that of the conventional case for the same reason as stated in regards with the DPP method.

As described above, in regards with an optical pickup that emits a light beam toward an information recording medium and reads information from a reflected light beam from the information recording medium, the present embodiment provides a compact, low-cost optical pickup that can detect the focus error signal by the SSD method and detect the tracking error signal by the DPP method and the DPD method, with relatively simple circuit structure of the light-sensitive element substrate, and a smaller number of external output terminals.

The present invention is not limited to the above-described embodiment, but may be modified in various ways. Each component of the diffraction grating element and the optical pickup may be modified freely in terms of the arrangement, measurement, quality of material, shape or the like.

For example, the diffraction grating area of the diffraction grating element is not necessarily be divided as explained in the present embodiment, but may be modified appropriately.

Figure 16:
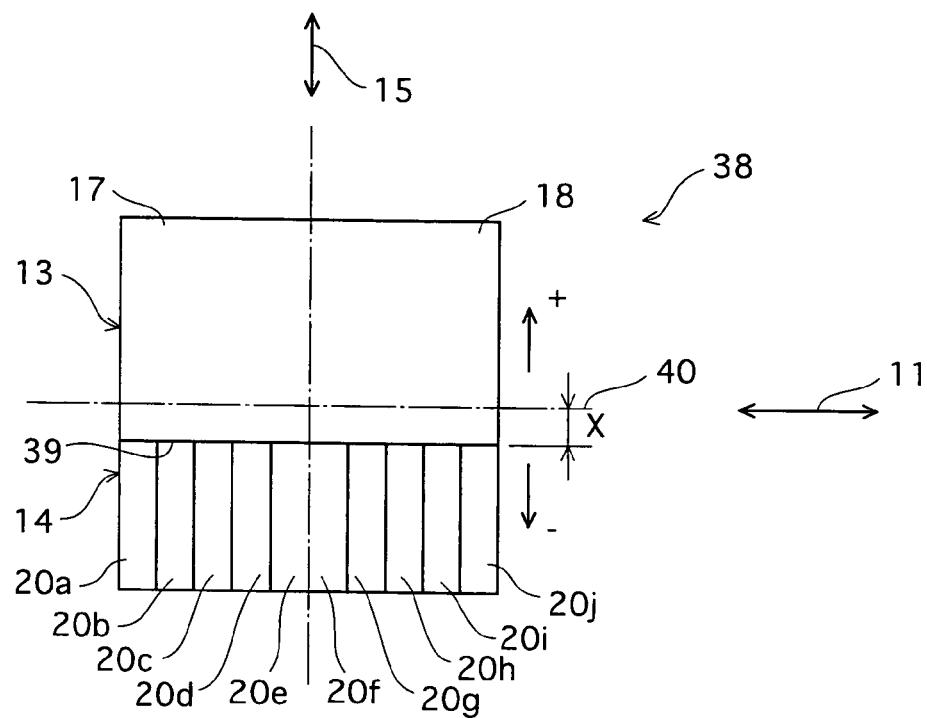
FIG. 16 is a plane view showing a diffraction grating area of a diffraction grating element of a modification example.
Figure 17:
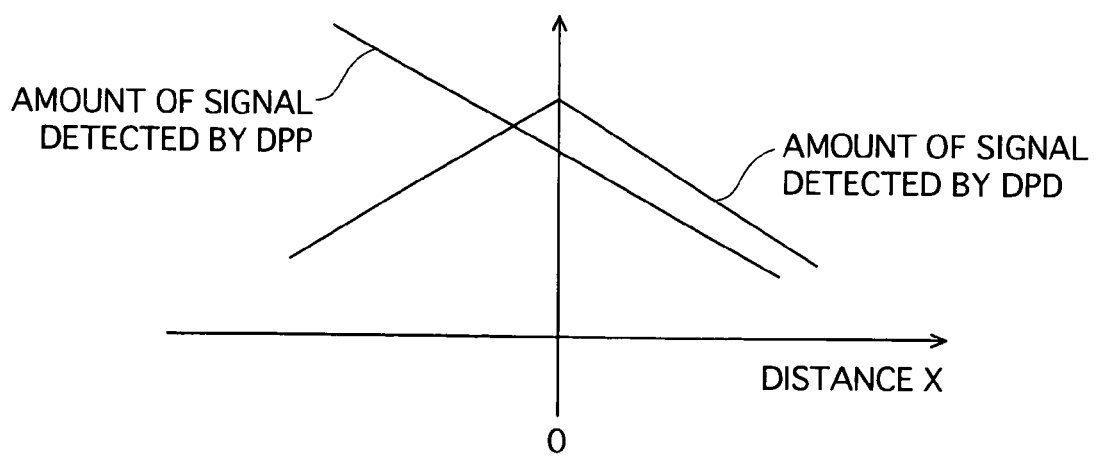
FIG. 17 is a graph showing relationships between distance X and the amount of signal.

(1) The straight line 12, which divides the diffraction grating area 10 into two divisional areas so that the divisional areas align in the tangential direction 15, may not intersect with the optical axis 7. FIG. 16 is a plane view showing a diffraction grating area of a diffraction grating element of a modification example. FIG. 17 is a graph showing relationships between distance X and the amount of detected signal.

As shown in FIG. 16, a diffraction grating area 38 of the modification example differs from the diffraction grating area 10 of the present embodiment shown in FIG. 10 in that a straight line 39 that divides the diffraction grating area 38 into two divisional areas aligning in the tangential direction does not intersect with the optical axis 7. The following description will center on the straight line 39 and omit or simplify the description of the other components that are the same as those of the present embodiment and will be identified by the same reference numbers.

The diffraction grating area 38 of the modification example is designed to improve the accuracy of detecting the tracking error signal by the DPP method, at the expense of a certain degree of accuracy of detecting the tracking error signal by the DPD method. As stated earlier, with the optical pickup 1 of the present invention, the amount of detected focus error signal by the SSD method is equal to that of the conventional pickup, the amount of detected tracking error signal by the DPP method is half that of the conventional pickup, and the amount of detected tracking error signal by the DPD method is half that of the conventional pickup.

Such reduction in the amount of signal is disadvantageous to a stable system operation. It is preferable that as large amount of signal as possible is obtained. To secure a larger amount of signal by the DPP method, the following construction may be adopted.

As shown in FIG. 16, in the diffraction grating area 38 of the modification example, the straight line 39 is distance X away from a straight line 40 that intersects with the optical axis 7 and is parallel to the radial direction 11. And as shown in FIG. 17, the amount of signal by the DPP method increases as the straight line 39 shifts downward in FIG. 16 (X<0), and decreases as the straight line 39 shifts upward in FIG. 16 (X>0). On the other hand, the amount of signal by the DPD method is maximized when X=0, and decreases as the distance X increases. It is therefore possible to secure a larger amount of signal by the DPP method by adjusting the distance X appropriately, while securing a necessary amount of signal by the DPD method.

(2) In the present embodiment, the second area 14 of the diffraction grating area 10 is divided into 10 divisional areas 20*a*–20*j* by nine straight lines 19*a*–19*i*. However, the second area 14 may be divided into three or more divisional areas, not limited to 10 divisional areas. It should be noted here that when the number of divisional areas decreases, the effect of averaging the deviation of the amount of light of the reflected beam 9 that enters the second area 14 is degraded, which may degrade the accuracy of detecting the tracking error signal by the DPD method. Also, when the number of divisional areas increases drastically, each of the divisional areas 20*a*–20*j* decreases in area, and the number of diffraction gratings decreases in each of the divisional areas 20*a*–20*j*. This may degrade the diffraction function and lens function of the diffraction grating element 5.

(3) In the present embodiment, the width of each of the divisional areas 20a–20j in the radial direction is substantially equivalent to each other. However, the width of each divisional area may not necessarily be equivalent to each other. Also, straight lines parallel to the tangential direction 15 may not necessarily be used to demarcate the divisional areas 20a–20j.

Figure 18:
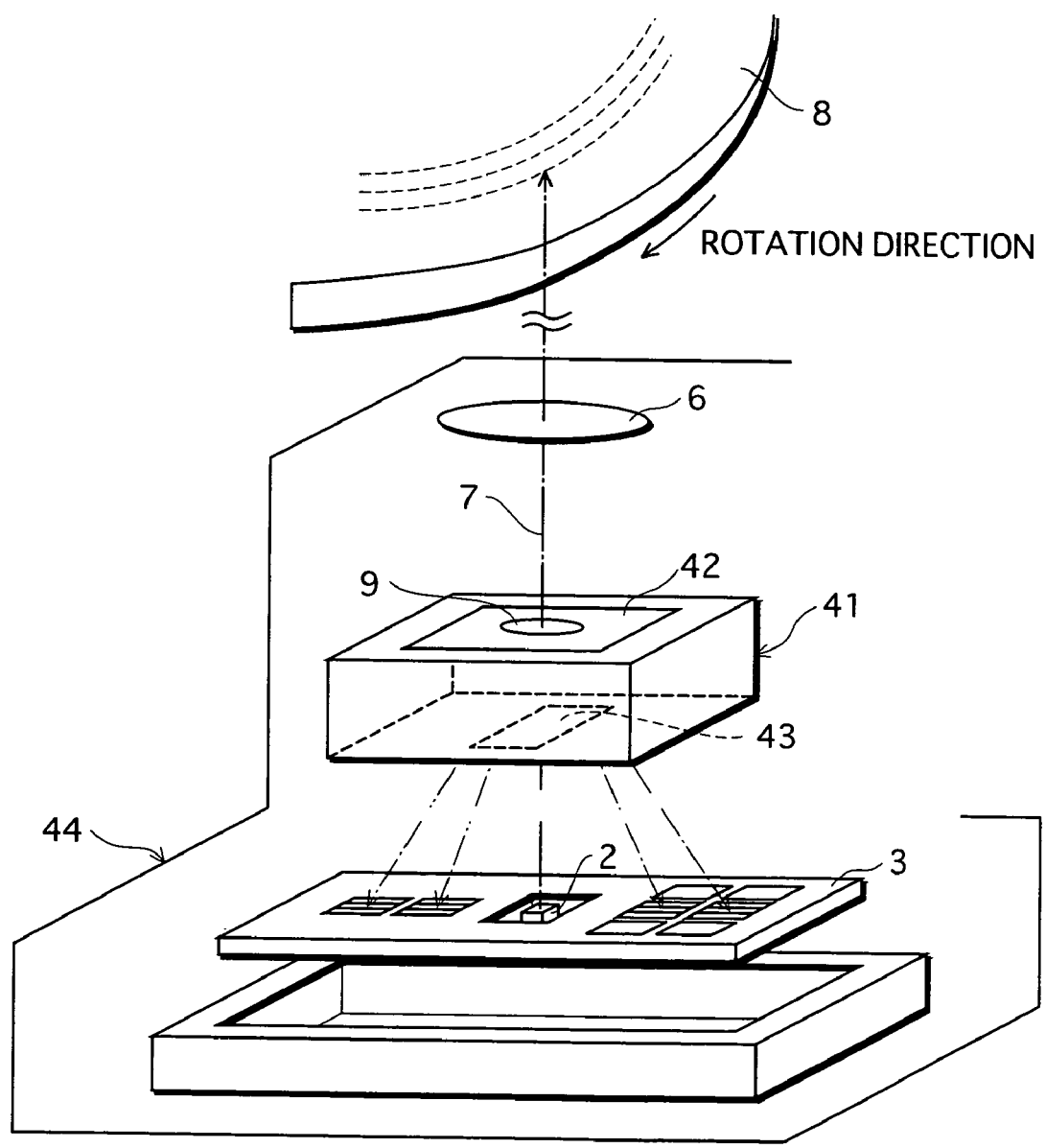
FIG. 18 is a perspective view showing an optical pickup having a diffraction grating element of a modification example.

Also, the diffraction grating element may have the following construction. FIG. 18 is a perspective view showing an optical pickup 44 having a diffraction grating element of a modification example.

As shown in FIG. 18, a diffraction grating element 41 of the present modification example has a diffraction grating area 42 formed on a first main surface thereof, and has a 3-beam diffraction grating 43 formed on a second main surface which is substantially parallel to the first main surface. The diffraction grating element 41, for example, is arranged so that the first main surface faces the objective lens 6 and the second main surface faces the light-sensitive element substrate 3, with the optical axis 7 passing through the center of each of these components.

A light beam emitted from the semiconductor laser 2 travels along the optical axis 7, passes through the 3-beam diffraction grating 43 and diffraction grating area 42 of the diffraction grating element 41, and then the objective lens 6 in the stated order, and converges on a pit sequence on a surface of the optical disc 8. The reflected beam 9 from the optical disc 8 travels along the optical axis 7 to return to the diffraction grating element 41, is divided at the diffraction grating area 42 thereof, and reaches the light-sensitive element substrate 3.

With the above-described construction in which the diffraction grating element 41 is provided with the 3-beam diffraction grating 43, the necessity to prepare a 3-beam diffraction grating separately has been eliminated. This reduces the number of components of the optical pickup 44.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A diffraction grating element including a diffraction grating area which comprises:
    a first area that is one of two areas into which the diffraction grating area is divided by a first straight line, and is divided, by a second straight line perpendicular to the first straight line, into a first sub-area having a first diffraction grating pattern and a second sub-area having a second diffraction grating pattern, the first and second diffraction grating patterns having different diffraction angles; and
    a second area that is the other of the two areas into which the diffraction grating area is divided by the first straight line, and is divided into three or more divisional areas that align in a direction perpendicular to the second straight line, the first and second diffraction grating patterns being alternately assigned to each of the divisional areas.

2. The diffraction grating element of claim 1, wherein
    a pair of adjacent divisional areas among the three or more divisional areas is divided by an extension of the second straight line.

3. The diffraction grating element of claim 1 further including:
    a first main surface which is provided with the diffraction grating area; and
    a second main surface which is substantially parallel to the first main surface, and is provided with a 3-beam diffraction grating.

4. An optical pickup comprising:
    a light source that emits light toward in information recording medium;
    a light-sensitive element substrate that receives a reflected light from the information recording medium, and converts an optical signal into an electric signal; and
    the diffraction grating element defined in claim 1 that diffracts the reflected light onto the light-sensitive element substrate, wherein the diffraction grating element is arranged so that the second straight line is parallel to a direction that is tangent to a curve of a pit sequence formed on the information recording medium, and so that the second straight line or the extension of the second straight line intersects with an optical axis of the light emitted by the light source.

5. The optical pickup of claim 4, wherein
the first straight line does not intersect with the optical axis of the light emitted by the light source.

6. The optical pickup of claim 4, wherein
the light-sensitive element substrate further includes:
    a first light-sensitive area that receives a plus-primary diffracted beam from an area having the first diffraction grating pattern in the diffraction grating area;
    a second light-sensitive area that receives a minus-primary diffracted beam from an area having the first diffraction grating pattern in the diffraction grating area;
    a third light-sensitive area that receives a plus-primary diffracted beam from an area having the second diffraction grating pattern in the diffraction grating area;
    a fourth light-sensitive area that receives a minus-primary diffracted beam from an area having the second diffraction grating pattern in the diffraction grating area.

7. The optical pickup of claim 6, wherein
each of the first to fourth light-sensitive areas is divided into three divisional areas that align in a direction perpendicular to the first straight line, and
the light-sensitive element substrate further includes
an arithmetic circuit that performs operations of photoelectric conversion signals received from the first to fourth light-sensitive areas.

8. The optical pickup of claim 4, wherein
a focus error signal is detected by a spot-size detection method, and a tracking error signal is detected by either a difference push-pull method or a differential phase detection method.

* * * * *